(12) United States Patent
Chi

(10) Patent No.: US 12,038,524 B2
(45) Date of Patent: Jul. 16, 2024

(54) DOPPLER RADAR APPARATUS AND NARROWBAND INTERFERENCE SUPPRESSION METHOD THEREOF

(71) Applicant: RichWave Technology Corp., Taipei (TW)

(72) Inventor: Hsiang-Feng Chi, Taipei (TW)

(73) Assignee: RichWave Technology Corp., Taipei (TW)

( * ) Notice: Subject to any disclaimer, the term of this patent is extended or adjusted under 35 U.S.C. 154(b) by 327 days.

(21) Appl. No.: 17/557,047

(22) Filed: Dec. 21, 2021

(65) Prior Publication Data

US 2023/0184882 A1    Jun. 15, 2023

(30) Foreign Application Priority Data

Nov. 18, 2021   (TW) .................. 110142955

(51) Int. Cl.
*G01S 7/02*   (2006.01)
*G01S 7/292*   (2006.01)
(Continued)

(52) U.S. Cl.
CPC .......... *G01S 7/023* (2013.01); *G01S 7/2922* (2013.01); *G01S 13/583* (2013.01); *G01S 2013/0272* (2013.01)

(58) Field of Classification Search
CPC ...... G01S 7/023; G01S 7/2922; G01S 13/583; G01S 2013/0272
See application file for complete search history.

(56) References Cited

U.S. PATENT DOCUMENTS 3,061,830 A * 10/1962 Gray .................. G01S 13/60
                                                    327/39
5,230,007 A *  7/1993 Baum ................ H03H 21/0043
                                                    375/232
(Continued)

FOREIGN PATENT DOCUMENTS

CN      109425856         3/2019
CN      109425856 A   *   3/2019   .......... G01S 13/003
(Continued)

OTHER PUBLICATIONS

"Office Action of Taiwan Counterpart Application", dated Aug. 4, 2022, p. 1-p. 4.

*Primary Examiner* — James R Hulka
*Assistant Examiner* — Maxine McKenzie Phillips
(74) *Attorney, Agent, or Firm* — JCIPRNET

(57) ABSTRACT

A Doppler radar apparatus including a transmitting device, a receiving device and a narrowband interference suppression device is provided. The transmitting device is configured to transmit a first wireless signal. The receiving device is coupled to the transmitting device and is configured to receive a second wireless signal to generate a first digital signal. The first digital signal includes a Doppler signal component and a narrowband interference signal component, and a bandwidth of the narrowband interference signal component is smaller than a bandwidth of the Doppler signal component. The narrowband interference suppression device is coupled to the receiving device and is configured to perform interference suppression on the first digital signal to suppress the narrowband interference signal component in the first digital signal to generate an output digital signal.

20 Claims, 12 Drawing Sheets

(51) Int. Cl.
G01S 13/02      (2006.01)
G01S 13/58      (2006.01)

(56)           References Cited

U.S. PATENT DOCUMENTS

| | | | | |
|---|---|---|---|---|
| 2002/0191580 | A1* | 12/2002 | Ishii | H04B 7/0897 |
| | | | | 375/E1.031 |
| 2005/0275582 | A1* | 12/2005 | Mohan | G01S 13/003 |
| | | | | 342/27 |
| 2009/0304125 | A1* | 12/2009 | Kim | H04L 1/0048 |
| | | | | 375/341 |
| 2010/0289581 | A1 | 11/2010 | Kim et al. | |
| 2017/0201330 | A1* | 7/2017 | Zhou | H04B 10/697 |
| 2018/0254927 | A1* | 9/2018 | Yagil | H04B 3/23 |
| 2019/0056476 | A1 | 2/2019 | Lin | |
| 2019/0195985 | A1 | 6/2019 | Lin et al. | |
| 2020/0058316 | A1 | 2/2020 | Short et al. | |

FOREIGN PATENT DOCUMENTS

| | | | |
|---|---|---|---|
| CN | 110658500 | | 1/2020 |
| CN | 110907899 | | 3/2020 |
| CN | 111190144 | | 5/2020 |
| EP | 3309577 | | 4/2018 |
| JP | 2002374184 A | * | 12/2002 |
| TW | I669522 | | 8/2019 |
| TW | 202015357 | | 4/2020 |
| WO | WO-2015061963 A1 | * | 5/2015 ............. H04B 1/525 |
| WO | 2020218925 | | 10/2020 |

\* cited by examiner

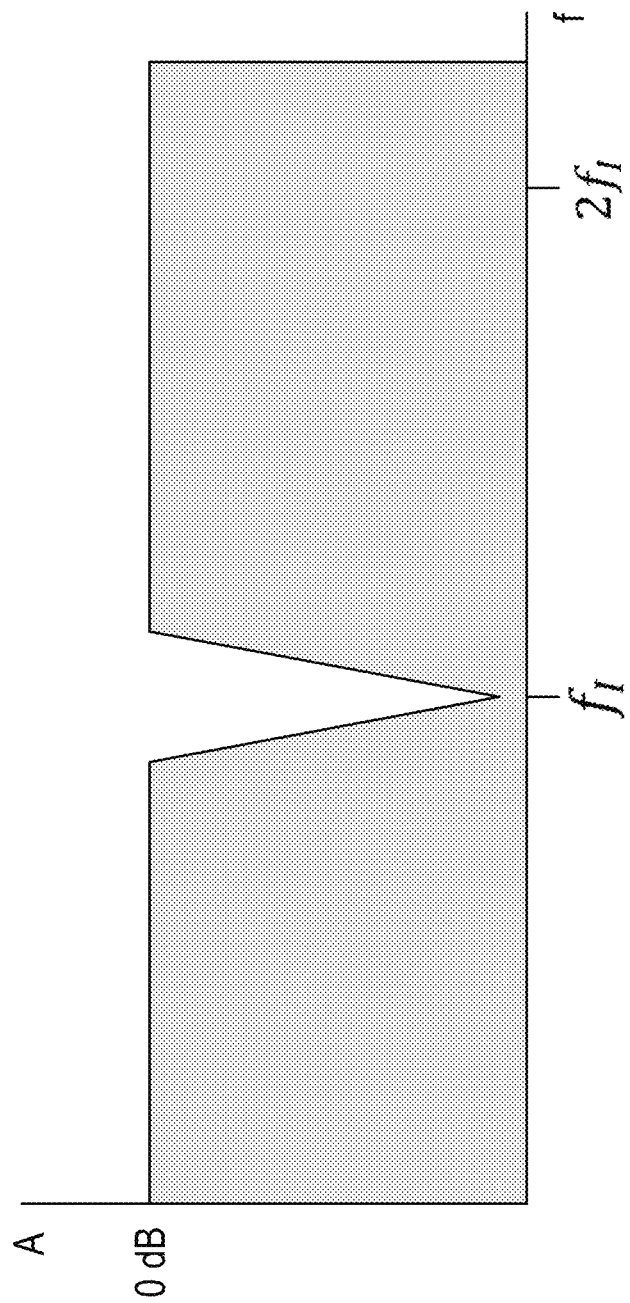

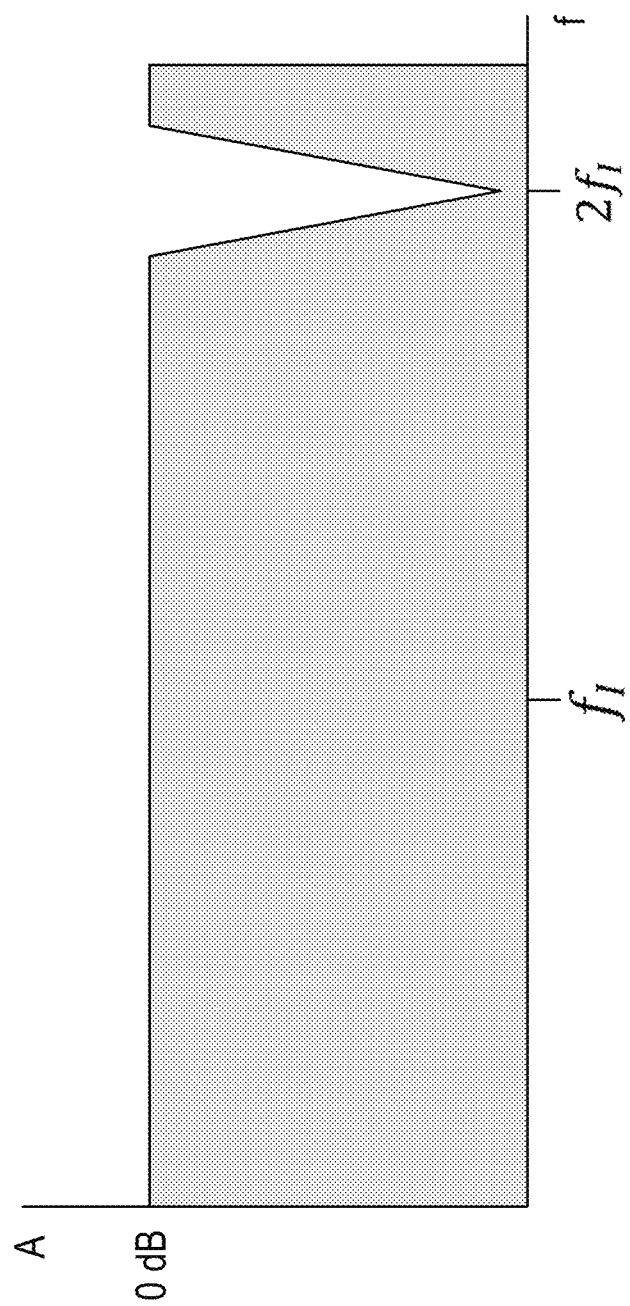

DOPPLER RADAR APPARATUS AND NARROWBAND INTERFERENCE SUPPRESSION METHOD THEREOF

CROSS-REFERENCE TO RELATED APPLICATION

This application claims the priority benefit of Taiwanese application no. 110142955, filed on Nov. 18, 2021. The entirety of the above-mentioned patent application is hereby incorporated by reference herein and made a part of this specification.

BACKGROUND

Technical Field

The disclosure relates to a radar technology, and in particular, to a Doppler radar apparatus and a narrowband interference suppression method thereof.

Description of Related Art

Radar technology has been developed for years and widely applied to many fields, such as radars in aviation, automotive radars, and radars for physiological information detection. Radars can be classified into two categories, pulse radars and continuous wave radars. A pulse radar transmits a periodic high-frequency pulse. A continuous wave radar transmits a continuous wave signal.

Narrowband interference often occurs in continuous wave Doppler motion detection. Narrowband interference may come from objects causing a constant frequency change in the environment, such as a power frequency, a frequency of a cathode ray tube of a lamp, or a rotation frequency of a fan. The constant-frequency electromagnetic change caused by the interference sources generates a narrowband interference signal component in a frequency domain. When a Doppler signal component, which is used for motion detection in a continuous-wave (CW) Doppler radar, is mixed with the narrowband interference signal component, a false alarm tends to occur.

SUMMARY

A first aspect of the embodiments of the disclosure provides a Doppler radar apparatus including a transmitting device configured to transmit a first wireless signal, a receiving device coupled to the transmitting device and configured to receive a second wireless signal to generate a first digital signal, and a narrowband interference suppression device. The first digital signal includes a Doppler signal component and a narrowband interference signal component, and a bandwidth of the narrowband interference signal component is smaller than a bandwidth of the Doppler signal component. The narrowband interference suppression device is coupled to the receiving device and is configured to perform interference suppression on the first digital signal to suppress the narrowband interference signal component in the first digital signal to generate an output digital signal. The narrowband interference suppression device includes a tapped delay line configured to obtain a delayed digital signal according to the first digital signal and an interference estimating device coupled to the tapped delay line. The interference estimating device is configured to generate an interference estimation signal according to the delayed digital signal and multiple weighting coefficients, update the weighting coefficients according to an error signal, and determine an adjustment signal according to the first digital signal, the weighting coefficients, and the error signal. The interference estimation signal corresponds to the narrowband interference signal component. The adjustment signal corresponds to interference suppression strength.

A second aspect of the embodiments of the disclosure provides a Doppler radar apparatus including a transmitting device configured to transmit a first wireless signal, a receiving device coupled to the transmitting device and configured to receive a second wireless signal to generate a first digital signal, and a narrowband interference suppression device. The first digital signal includes a Doppler signal component and a narrowband interference signal component, and a bandwidth of the narrowband interference signal component is smaller than a bandwidth of the Doppler signal component. The narrowband interference suppression device is coupled to the receiving device and is configured to perform interference suppression on the first digital signal to suppress the narrowband interference signal component in the first digital signal to generate an output digital signal. The narrowband interference suppression device includes a high-pass filter configured to filter the Doppler signal component of the first digital signal to generate an interference tracking digital signal, and an interference estimating device. The interference estimating device is configured to obtain multiple weighting coefficients associated with an interference frequency of the narrowband interference signal component according to the interference tracking digital signal, obtain an error signal according to the interference tracking digital signal and the weighting coefficients, update the weighting coefficients according to the error signal, and determine an adjustment signal according to the weighting coefficients, and the error signal. The adjustment signal corresponds to interference suppression strength.

A third aspect of the embodiments of the disclosure provides a narrowband interference suppression method applied to a Doppler radar apparatus including a transmitting device, a receiving device, and a narrowband interference suppression device. The narrowband interference suppression method includes the following. A first wireless signal is transmitted. A second wireless signal is received to generate a first digital signal. The first digital signal includes a Doppler signal component and a narrowband interference signal component, and a bandwidth of the narrowband interference signal component is smaller than a bandwidth of the Doppler signal component. Interference suppression is performed on the first digital signal to suppress the narrowband interference signal component in the first digital signal to generate an output digital signal. The interference suppression includes the following. A delayed digital signal is obtained according to the first digital signal. An interference estimation signal is generated according to the delayed digital signal and multiple weighting coefficients. The weighting coefficients are updated according to an error signal. An adjustment signal is determined according to the first digital signal, the weighting coefficients, and the error signal. The interference estimation signal corresponds to the narrowband interference signal component. The adjustment signal corresponds to interference suppression strength.

A fourth aspect of the embodiments of the disclosure provides a narrowband interference suppression method applied to a Doppler radar apparatus including a transmitting device, a receiving device, and a narrowband interference suppression device. The narrowband interference suppression method includes the following. A first wireless signal is transmitted. A second wireless signal is received to generate a first digital signal. The first digital signal includes a Doppler signal component and a narrowband interference signal component, and a bandwidth of the narrowband interference signal component is smaller than a bandwidth of the Doppler signal component. Interference suppression is performed on the first digital signal to suppress the narrowband interference signal component in the first digital signal to generate an output digital signal. The interference suppression includes the following. The Doppler signal component of the first digital signal is filtered to generate an interference tracking digital signal. Multiple weighting coefficients associated with an interference frequency of the narrowband interference signal component are obtained according to the interference tracking digital signal. An error signal is obtained according to the interference tracking digital signal and the weighting coefficients. The weighting coefficients are updated according to the error signal. An adjustment signal is determined according to the weighting coefficients. The adjustment signal corresponds to interference suppression strength.

In order to make the aforementioned features of the disclosure comprehensible, embodiments accompanied with drawings are described in detail below.

BRIEF DESCRIPTION OF THE DRAWINGS

FIG. 6B is a schematic diagram of frequency response of the first notch filter according to the second embodiment of the disclosure.

FIG. 7B is a schematic diagram of frequency response of the second notch filter according to the second embodiment of the disclosure.

DESCRIPTION OF THE EMBODIMENTS

Figure 1A:
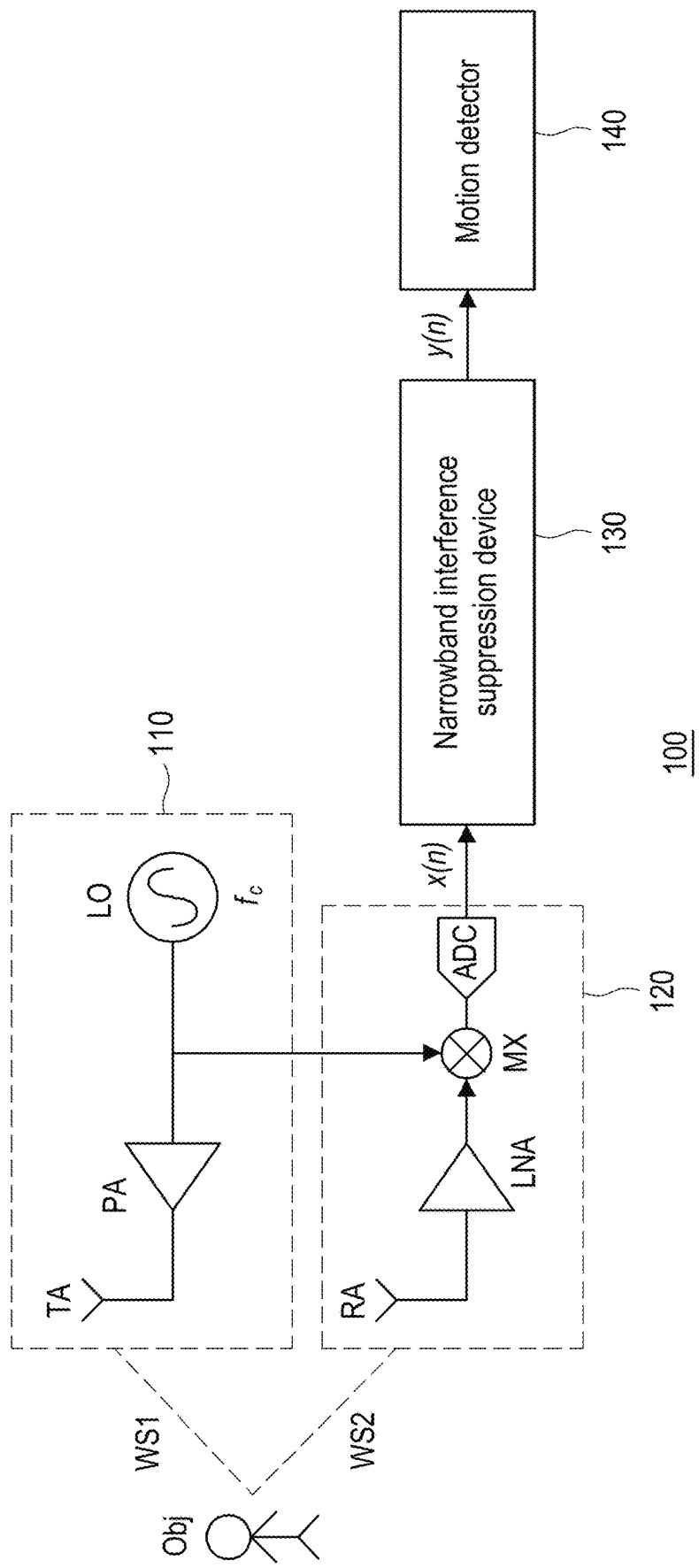
FIG. 1A is a schematic diagram of a Doppler radar apparatus according to embodiments of the disclosure.

FIG. 1A is a schematic diagram of a Doppler radar apparatus according to embodiments of the disclosure. Referring to FIG. 1A, a Doppler radar apparatus 100 includes a transmitting device 110, a receiving device 120, and a narrowband interference suppression device 130. The Doppler radar apparatus 100 may be applied to the fields of meteorology, speed sensing, car reversing, geography, military, physiological detection, and so on. The Doppler radar apparatus of the embodiment is configured to detect motion information of an object Obj in a field.

The transmitting device 110 is configured to transmit a first wireless signal WS1. The receiving device 120 is coupled to the transmitting device 110. The receiving device 120 is configured to receive a second wireless signal WS2 to generate a first digital signal x(n). The narrowband interference suppression device 130 is coupled to the receiving device 120. The narrowband interference suppression device 130 is configured to perform interference suppression to generate an output digital signal y(n) according to the first digital signal x(n). A detailed operation of the narrowband interference suppression device 130 performing the interference suppression will be described in detail in the embodiments below.

In an embodiment, the Doppler radar apparatus 100 further includes a motion detector 140 coupled to the narrowband interference suppression device 130. The motion detector 140 may determine a motion of the object Obj according to the output digital signal y(n). Specifically, the second wireless signal WS2 received by the receiving device 120 may include a reflection signal generated by the object Obj reflecting the first wireless signal WS1 transmitted by the transmitting device 110. The narrowband interference suppression device 130 or the motion detector 140 may be a chip, a processor, a microcontroller, an application-specific integrated circuit (ASIC), or any type of digital circuit. The narrowband interference suppression device 130 or the motion detector 140 may also be realized through a computer program module with a software algorithm.

In an embodiment, the transmitting device 110 includes a local oscillator LO, a power amplifier PA, and a transmitting end antenna TA. The local oscillator LO is configured to generate an oscillation signal including a clock frequency $f_c$. A receiving end of the power amplifier PA is coupled to the local oscillator LO to receive the oscillation signal and provide a radio frequency signal. A transmitting end antenna TA is coupled to the power amplifier PA and is controlled by the power amplifier PA to convert and transmit the radio frequency signal into the first wireless signal WS1 transmitted by the transmitting device 110.

In an embodiment, the receiving device 120 includes a receiving end antenna RA, a low-noise amplifier LNA, a frequency mixer MX, and an analog-to-digital converter ADC. The receiving end antenna RA receives the second wireless signal WS2 received by the receiving device 120 to generate a first analog signal. The low-noise amplifier LNA is coupled to the receiving end antenna RA and amplifies the first analog signal to generate a first amplified signal. The frequency mixer MX is coupled to the low-noise amplifier LNA and the local oscillator LO in the transmitting device 110. The frequency mixer MX performs frequency mixing on the first amplified signal according to the clock frequency $f_c$ of the first oscillation signal from the local oscillator LO to generate an analog receiving signal. The analog-to-digital converter ADC is coupled to the frequency mixer MX and is configured to convert the analog receiving signal into the first digital signal x(n).

To facilitate understanding of the operation process of the embodiments of the disclosure, the operation of the Doppler radar apparatus 100 in the embodiments of the disclosure is described in detail with multiple examples below. The narrowband interference suppression method provided in the embodiments of the disclosure will be described below accompanied with the description of each element of the Doppler radar apparatus 100 below. Each step of the method may be adjusted according to implementations, and the disclosure is not limited thereto.

Figure 1B:
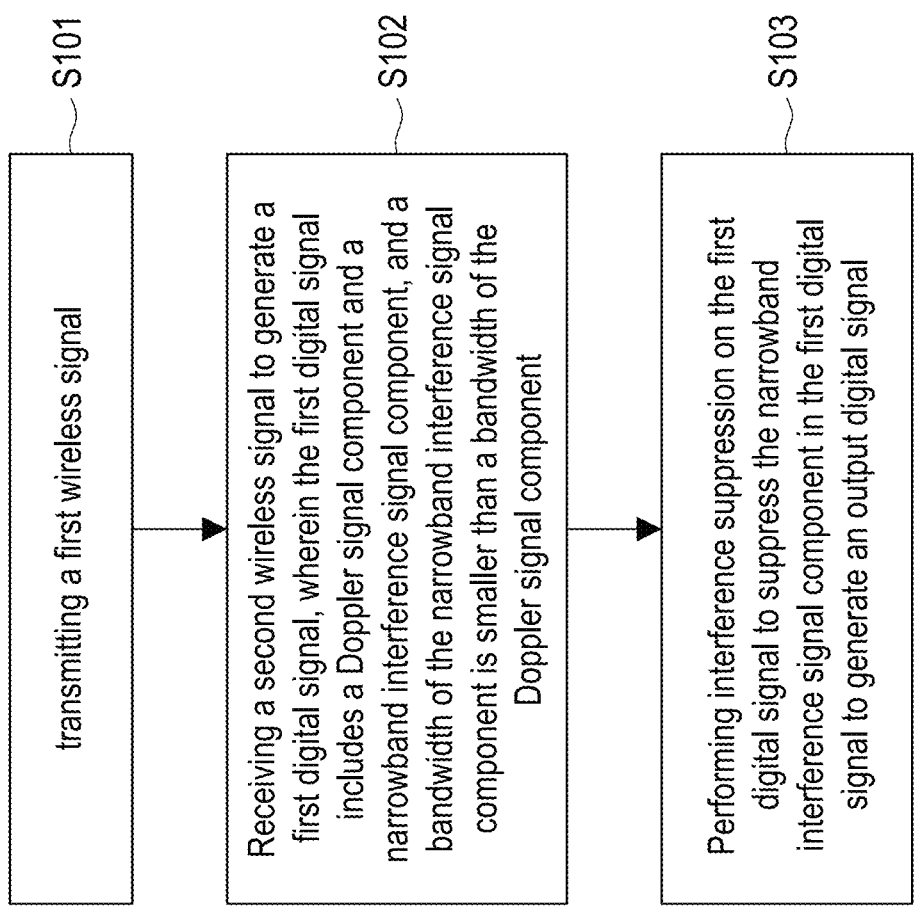
FIG. 1B is a flow chart of a narrowband interference suppression method according to embodiments of the disclosure.

FIG. 1B is a flow chart of a narrowband interference suppression method according to embodiments of the disclosure. Referring to FIG. 1B, a narrowband interference suppression method of FIG. 1B is applied to the Doppler radar apparatus 100 shown in FIG. 1A.

In step S101, the transmitting device 110 transmits the first wireless signal WS1 to detect the object Obj in the field. In step S102, the receiving device 120 receives the second wireless signal WS2 to generate the first digital signal x(n). In step S103, the narrowband interference suppression device 130 is configured to perform interference suppression on the first digital signal x(n) to suppress the narrowband interference signal component in the first digital signal x(n) to generate an output digital signal y(n).

Figure 2:
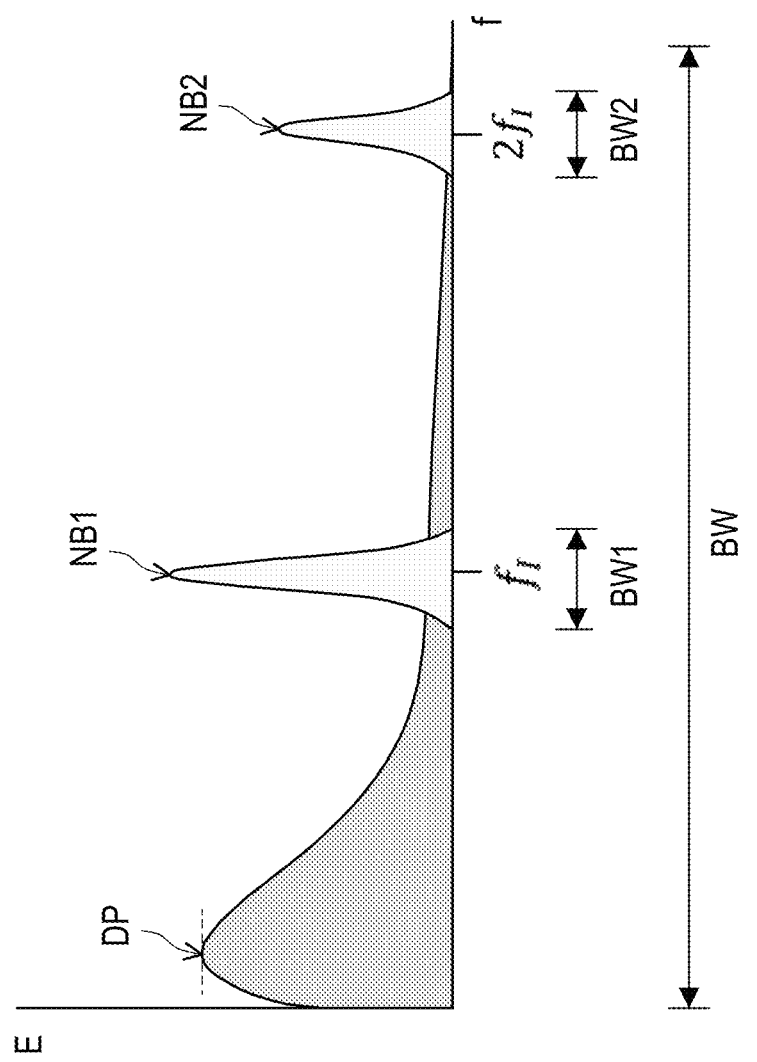
FIG. 2 is a schematic diagram of a Doppler signal component and a narrowband interference signal component according to embodiments of the disclosure.

FIG. 2 is a schematic diagram of a Doppler signal component and a narrowband interference signal component according to embodiments of the disclosure. In FIG. 2, the vertical axis represents the energy E, and the horizontal axis represents the frequency f. Specifically, the first digital signal x(n) may include a Doppler signal component DP and a narrowband interference signal component, such as a narrowband interference signal component NB1 and/or a narrowband interference signal component NB2 shown in FIG. 2. The narrowband interference signal component NB1 corresponds to an interference frequency $f_1$. The narrowband interference signal component NB2 corresponds to an interference frequency $2f_1$. The Doppler signal component DP has a bandwidth BW. The narrowband interference signal component NB1 has a bandwidth BW1. The narrowband interference signal component NB2 has a bandwidth BW2. Generally, the bandwidth BW1 of the narrowband interference signal component NB1 or the bandwidth BW2 of the narrowband interference signal component NB2 is smaller than the bandwidth BW of the Doppler signal component DP.

Figure 3A:
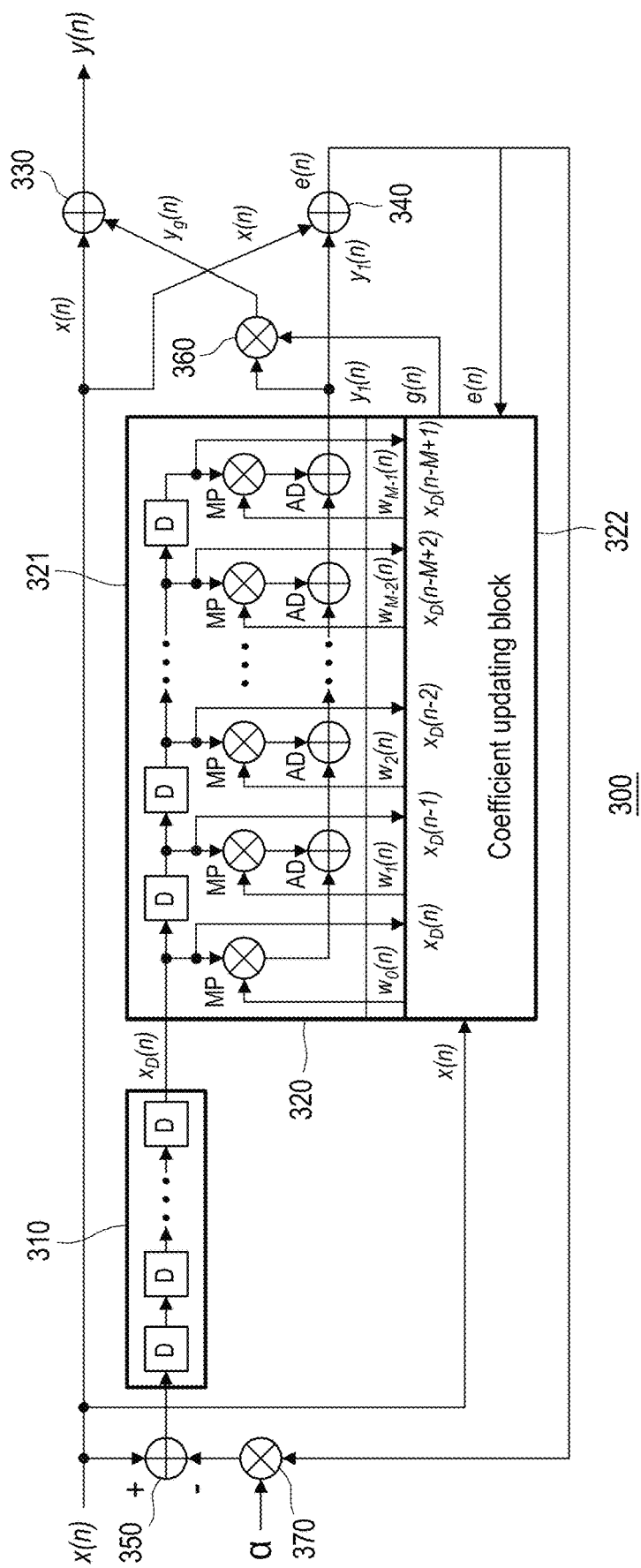
FIG. 3A is a schematic diagram of a narrowband interference suppression device according to a first embodiment of the disclosure.

FIG. 3A is a schematic diagram of the narrowband interference suppression device 130 according to a first embodiment of the disclosure. A narrowband interference suppression device 300 shown in FIG. 3A is an implementation of the narrowband interference suppression device 130 shown in FIG. 1A; however, the disclosure is not limited thereto.

Referring to FIG. 3A, the narrowband interference suppression device 300 includes a tapped delay line 310 and an interference estimating device 320. The tapped delay line 310 is configured to obtain a delayed digital signal $x_D(n)$ according to the first digital signal x(n). The tapped delay line 310 includes multiple sample delay taps D. The interference estimating device 320 is coupled to the tapped delay line 310 and configured to estimate characteristics of the narrowband interference. The interference estimating device 320 may receive the first digital signal x(n), the delayed digital signal $x_D(n)$, and an error signal e(n) to generate a digital signal $y_1(n)$ and an adjustment signal g(n). The interference estimating device 320 includes two parts of a filtering block 321 and a coefficient updating block 322. The filtering block 321 includes (M−1) delay taps D, M multipliers MP, and (M−1) adders AD. M is an integer. The coefficient updating block 322 stores M weighting coefficients $w_0(n)$, $w_1(n)$, $w_2(n)$ to $w_{M-2}(n)$, and $w_{M-1}(n)$ and performs iteration to update the weighting coefficients $w_0(n)$, $w_1(n)$, $w_2(n)$ to $w_{M-2}(n)$, and $w_{M-1}(n)$ according to the first digital signal x(n), the delayed digital signal $x_D(n)$, and the error signal e(n).

Figure 3B:
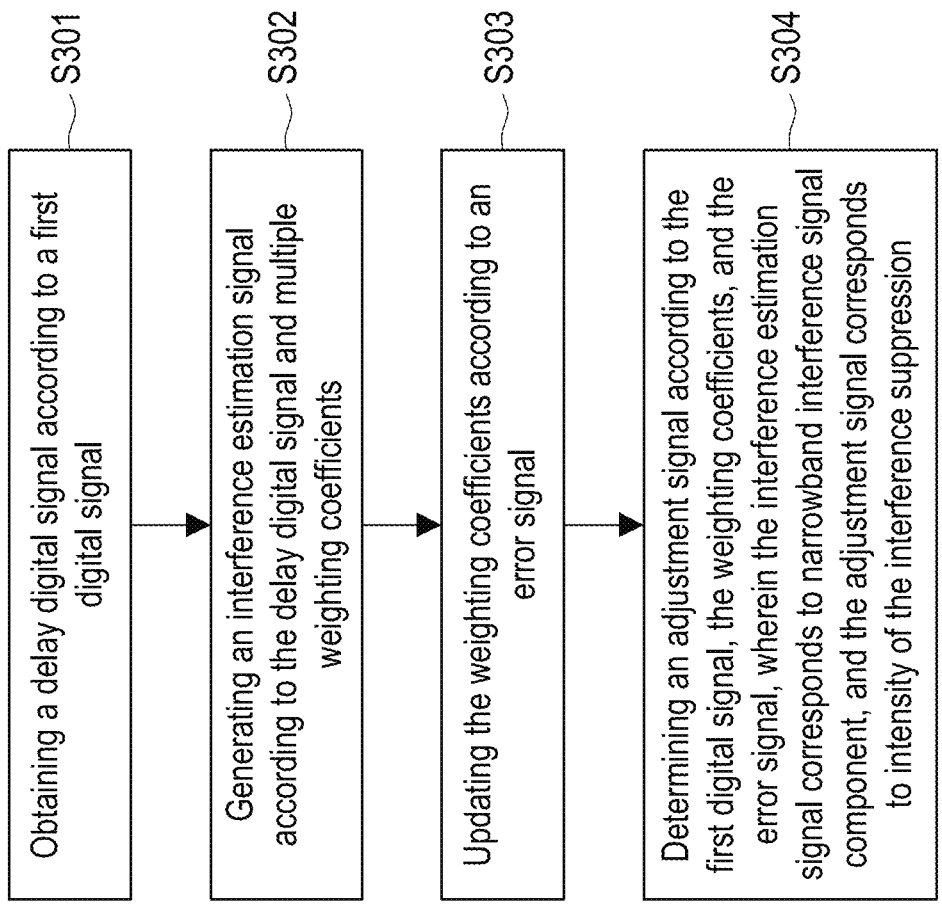
FIG. 3B is a flow chart of interference suppression of a narrowband interference suppression method according to the first embodiment of the disclosure.

FIG. 3B is a flow chart of interference suppression of a narrowband interference suppression method according to the first embodiment of the disclosure. Referring to FIGS. 3A and 3B together, the narrowband interference suppression device 300 may execute the process of the interference suppression shown in the flow chart of FIG. 3B.

In step S301, the tapped delay line 310 obtains the delayed digital signal $x_D(n)$ according to the first digital signal x(n). In step S302, the filtering block 321 of the interference estimating device 320 generates the interference estimation signal $y_1(n)$ according to the delayed digital signal $x_D(n)$ and the multiple weighting coefficients $w_0(n)$, $w_1(n)$, $w_2(n)$ to $w_{M-2}(n)$, and $w_{M-1}(n)$. In step S303, the coefficient updating block 322 of the interference estimating device 320 updates the weighting coefficients $w_0(n)$, $w_1(n)$, $w_2(n)$ to $w_{M-2}(n)$, and $w_{M-1}(n)$ according to the error signal e(n). In step S304, the coefficient updating block 322 of the interference estimating device 320 determines the adjustment signal g(n) according to the first digital signal x(n), the weighting coefficients $w_0(n)$, $w_1(n)$, $w_2(n)$ to $w_{M-2}(n)$, and $w_{M-1}(n)$, and the error signal e(n). The interference estimation signal $y_1(n)$ corresponds to narrowband interference signal component, such as the narrowband interference signal component NB1 or the narrowband interference signal component NB2 shown in FIG. 2. The adjustment signal g(n) corresponds to interference suppression strength.

Specifically, the interference estimating device 320 may be a linear prediction filter. The interference estimating device 320 gradually updates the weighting coefficients $w_0(n)$, $w_1(n)$, $w_2(n)$ to $w_{M-2}(n)$, and $w_{M-1}(n)$ in a manner of linear iteration.

A process of the linear iteration performed by the interference estimating device 320 may be shown in the equations below and may be executed by the coefficient updating block 322.

$$p_x(n) = p_x(n-1) + \eta \times (x^2(n) - p_x(n-1)) \quad \text{(Equation 1-1)}$$

$$w_m(n+1) = w_m(n) + \frac{\mu}{p_x(n)+c} \times e(n) \times x_D(n-m),$$

$$m = 0, 1, 2, \ldots, M-1 \quad \text{(Equation 1-2)}$$

In the equations above, $p_x(n)$ and $p_x(n-1)$ are linear iteration coefficients corresponding to the first digital signal x(n). The parameters η, μ, c are adopted to adjust an updating speed of the weighting coefficients $w_0(n)$, $w_1(n)$, $w_2(n)$ to $w_{M-2}(n)$, and $w_{M-1}(n)$ and variation of each update. Note that the linear iteration of the interference estimating device 320 may be realized through a method of a software program module or through a method of a hardware circuit.

In an embodiment, the narrowband interference suppression device 300 further includes an adder 330, am adder 340, an adder 350, a multiplier 360, and a multiplier 370. The multiplier 360 is coupled to the interference estimating device 320. The multiplier 360 is configured to multiply the interference estimation signal $y_1(n)$ by the adjustment signal g(n) to generate an interference suppression signal $y_g(n)$. The adder 330 is coupled to the multiplier 360. The adder 330 is configured to subtract the interference suppression signal $y_g(n)$ from the first digital signal x(n) to generate the output digital signal y(n). The adder 340 is coupled to the interference estimating device 320. The adder 340 is configured to subtract the interference estimation signal $y_1(n)$ from the first digital signal $x(n)$ to generate the error signal $e(n)$. The multiplier 370 is coupled to the adder 340 and the adder 350. The multiplier 370 is configured to multiply the error signal $e(n)$ by a tracking coefficient $\alpha$ and feed back to the first digital signal $x(n)$ through the adder 350. The tracking coefficient $\alpha$ is adopted to adjust a frequency selection range of the interference suppression signal $y_g(n)$. Specifically, the tracking coefficient $\alpha$ is a number in a range of 0 to 1. The tracking coefficient $\alpha$ may adjust a weight of negative feedback of the error signal $e(n)$, which is the intensity of the feedback of the narrowband interference estimation error. Therefore, the frequency tracking range of the interference estimation may be adjusted through the tracking coefficient $\alpha$.

In an embodiment, the interference estimating device 320 determines a reference value $r$ according to the weighting coefficients $w_0(n)$, $w_1(n)$, $w_2(n)$ to $w_{M-2}(n)$, and $w_{M-1}(n)$.

Specifically, the reference value $r$ may be calculated through the equation below:

$$r = \frac{1 - \sum_{m=0}^{M-1} w_m(n)}{1 + \sum_{m=0}^{M-1} (-1)^m \cdot w_m(n)}$$

In an embodiment, in response to the reference value $r$ being greater than or equal to a threshold value $r_{th}$, the interference estimating device 320 updates the adjustment signal $g(n)$ to enhance the interference suppression according to an adjustment parameter $\beta$. In an embodiment, in response to the reference value $r$ being less than the threshold value $r_{th}$, the interference estimating device 320 updates the adjustment signal $g(n)$ to reduce the interference suppression strength according to the adjustment parameter $\beta$. Specifically, the adjustment signal $g(n)$ may be updated through the equation below.

$$g(n) = \begin{cases} g(n-1) + \beta \times (1 - g(n-1)), & r \geq r_{th} \\ g(n-1) + \beta \times g(n-1), & r < r_{th} \end{cases}$$

Note that a value of the adjustment signal $g(n)$ is in a range of 0 to 1. The adjustment signal $g(n)$ may correspond a relation between the intensity of the Doppler signal component and the intensity of the narrowband interference signal component in the first digital signal $x(n)$. The greater the adjustment signal $g(n)$ is, the greater the intensity of the narrowband interference signal component is. The interference estimation signal $y_1(n)$ generated by the interference estimating device 320 may be subtracted at a great proportion from the first digital signal $x(n)$. That is, the greater the adjustment signal $g(n)$ is, the greater the interference suppression strength can be. Conversely, when the adjustment signal $g(n)$ is small, it is not necessary to suppress the narrowband interference signal component in the first digital signal $x(n)$. Therefore, by adjusting the adjustment signal $g(n)$ corresponding to the intensity of the narrowband interference signal component in the digital signal, the interference suppression strength may be adaptably adjusted avoid unnecessary signal suppression and hence to reduce a miss rate of Doppler motion detection.

Figure 4A:
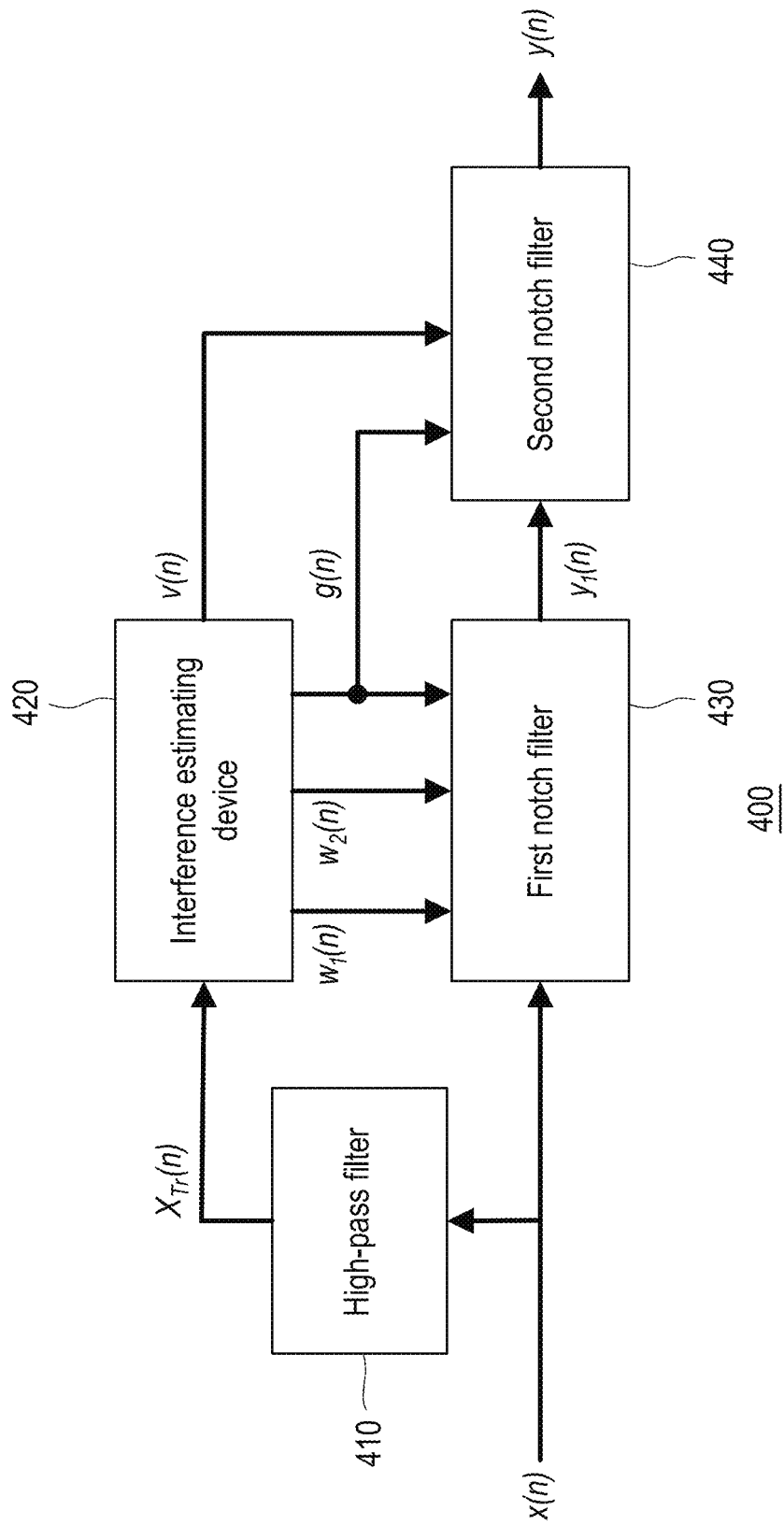
FIG. 4A is a schematic diagram of a narrowband interference suppression device according to a second embodiment of the disclosure.

FIG. 4A is a schematic diagram of the narrowband interference suppression device 130 according to a second embodiment of the disclosure. A narrowband interference suppression device 400 shown in FIG. 4A is an implementation of the narrowband interference suppression device 130 shown in FIG. 1A; however, the disclosure is not limited thereto.

Referring to FIG. 4A, the narrowband interference suppression device 400 includes a high-pass filter 410, an interference estimating device 420, a first notch filter 430, and a second notch filter 440.

Figure 4B:
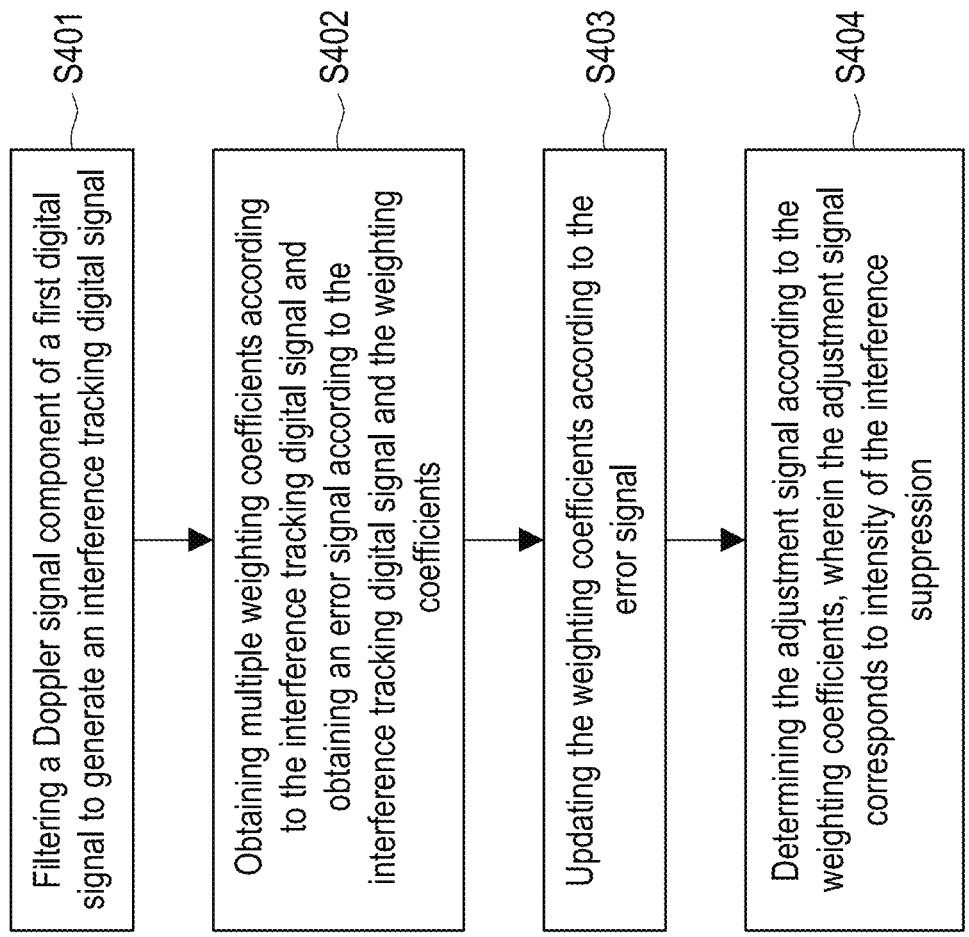
FIG. 4B is a flow chart of interference suppression of a narrowband interference suppression method according to the second embodiment of the disclosure.

FIG. 4B is a flow chart of interference suppression of a narrowband interference suppression method according to the second embodiment of the disclosure. Referring to FIGS. 4A and 4B together, the narrowband interference suppression device 400 may execute the process of the interference suppression shown in the flow chart of FIG. 4B.

In step S401, the high-pass filter 410 filters a low frequency component of the first digital signal $x(n)$, such as the Doppler signal component, to generate an interference tracking digital signal $x_{Tr}(n)$. In step S402, the interference estimating device 420 obtains the multiple weighting coefficients $w_1(n)$ and $w_2(n)$ according to the interference tracking digital signal $x_{Tr}(n)$. The weighting coefficients $w_1(n)$ and $w_2(n)$ are associated with the interference frequency of the narrowband interference signal component. The error signal $e(n)$ is obtained according to the interference tracking digital signal $x_{Tr}(n)$ and the weighting coefficients $w_1(n)$ and $w_2(n)$. In step S403, the interference estimating device 420 updates the weighting coefficients $w_1(n)$ and $w_2(n)$ according to the error signal $e(n)$. In step S404, the adjustment signal $g(n)$ is determined according to the weighting coefficients $w_1(n)$ and $w_2(n)$. The adjustment signal $g(n)$ corresponds to the interference suppression strength.

Specifically, the interference estimating device 420 may be a linear prediction filter. The interference estimating device 420 gradually updates the weighting coefficients $w_1(n)$ and $w_2(n)$ in a manner of iteration.

A process of the linear iteration performed by the interference estimating device 420 may be shown in the equations below.

$$e(n) = x_{Tr}(n) - w_1(n)x_{Tr}(n-1) - w_2(n)x_{Tr}(n-2) \quad \text{(Equation 2-1)}$$

$$x_p(n) = P(n) \cdot \begin{bmatrix} x_{Tr}(n-1) \\ x_{Tr}(n-2) \end{bmatrix} \quad \text{(Equation 2-2)}$$

$$a(n) = \frac{x_p(n)}{(\lambda + [x_{Tr}(n-1)x_{Tr}(n-2)] \cdot x_p(n))} \quad \text{(Equation 2-3)}$$

$$P(n+1) = (P(n) - a(n) \cdot x_p^T(n))/\lambda \quad \text{(Equation 2-4)}$$

$$\begin{bmatrix} w_1(n+1) \\ w_2(n+1) \end{bmatrix} = \begin{bmatrix} w_1(n) \\ w_2(n) \end{bmatrix} + e(n) \cdot a(n) \quad \text{(Equation 2-5)}$$

$$v(n) = w_1^2(n) - 2 \quad \text{(Equation 2-6)}$$

$$\text{Initial value } P(0) = \sigma \begin{bmatrix} 1 & 0 \\ 0 & 1 \end{bmatrix} \quad \text{(Equation 2-7)}$$

In the equations above, elements in a vector $x_p(n)$ respectively correspond to linear interference estimation signals of interference tracking digital signals $x_{Tr}(n-1)$ and $x_{Tr}(n-2)$. Each element in a matrix $P(n)$ is a linear iteration coefficient. Elements in a vector $a(n)$ respectively correspond to updating weights of the weighting coefficients $w_1(n)$ and $w_2(n)$. A parameter $\lambda$ is adopted to adjust an updating speed of the weighting coefficients $w_1(n)$ and $w_2(n)$ and variation of each update. A parameter $\sigma$ is adopted to adjust a weight of initial values of the interference tracking digital signals $x_{Tr}(n-1)$ and $x_{Tr}(n-2)$ influencing linear iteration. Specifically, the weighting coefficients $w_1(n)$ and $w_2(n)$ and a filter coefficient $v(n)$ are associated with interference frequencies of the narrowband interference signal component. In an embodiment, the weighting coefficients $w_1(n)$ and $w_2(n)$ are parameters corresponding to an interference fundamental frequency (a first harmonic, such as the $f_1$) in the narrowband interference signal component, and the filter coefficient $v(n)$ is a parameter corresponding to a twice of the interference fundamental frequency (a second harmonic, such as the $2f_1$) in the narrowband interference signal component. Note that the linear iteration of the interference estimating device 420 may be realized through a method of a software program module or through a method of a hardware circuit.

Figure 5:
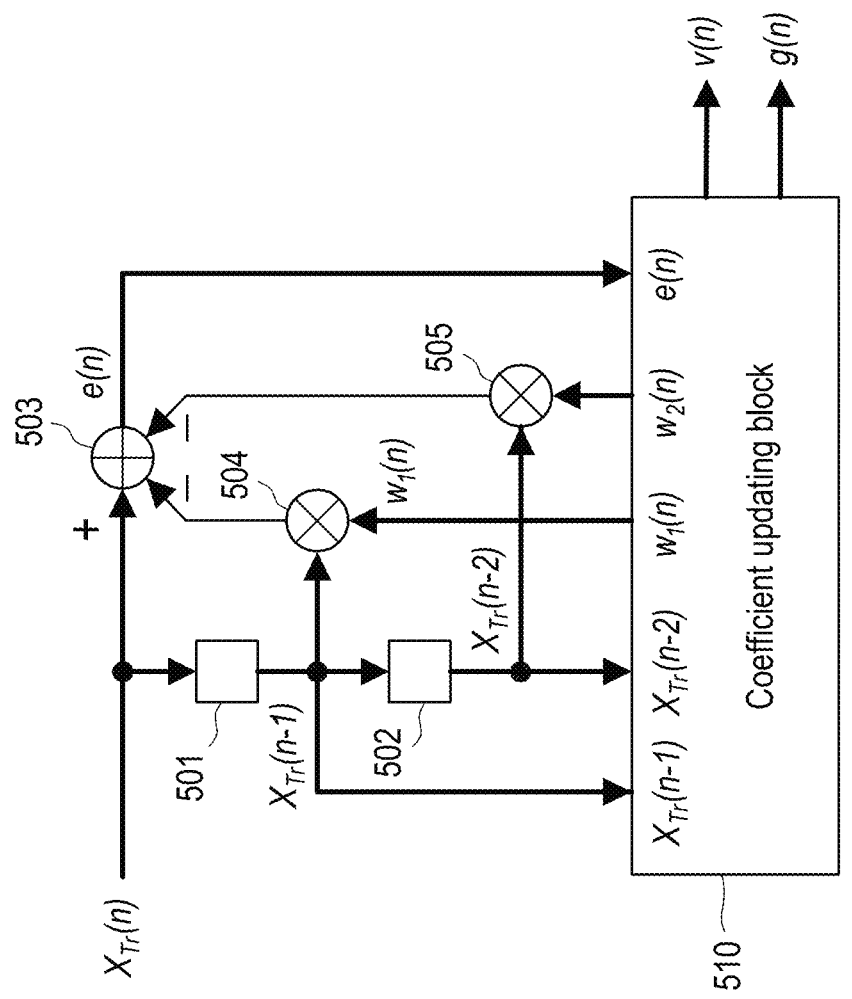
FIG. 5 is a schematic diagram of an interference estimating device according to the second embodiment of the disclosure.

FIG. 5 is a schematic diagram of the interference estimating device 420 according to the second embodiment of the disclosure. Referring to FIG. 5, the interference estimating device 420 includes a delay tap 501, a delay tap 502, an adder 503, a multiplier 504, a multiplier 505, and a coefficient updating block 510.

In the equations above, (Equation 2-1) may be executed through the following. The digital signal $x_{Tr}(n)$ is delayed by the delay tap 501 to generate the digital signal $x_{Tr}(n-1)$. The digital signal $x_{Tr}(n-1)$ is further delayed by the delay tap 502 to generate the digital signal $x_{Tr}(n-2)$. The multiplier 504 multiplies the digital signal $x_{Tr}(n-1)$ by the weighting coefficient $w_1(n)$ to obtain the digital signal $w_1(n) x_{Tr}(n-1)$. The multiplier 505 multiplies the digital signal $x_{Tr}(n-2)$ by the weighting coefficient $w_2(n)$ to obtain the digital signal $w_2(n) x_{Tr}(n-2)$. The adder 503 subtracts the computing result $w_1(n) x_{Tr}(n-1)$ of the multiplier 504 and the computing result $w_2(n) x_{Tr}(n-2)$ of the multiplier 505 from the digital signal $x_{Tr}(n)$ to generate the error signal $e(n)$. The coefficient updating block 510 may be applied to the (Equation 2-2) to the (Equation 2-7) to store and update the digital signals $x_{Tr}(n-1)$ and $x_{Tr}(n-2)$, the weighting coefficients $w_1(n)$ and $w_2(n)$, and the error signal $e(n)$ and to generate the filter coefficient $v(n)$ and the adjustment signal $g(n)$.

In an embodiment, the weighting coefficients $w_1(n)$ and $w_2(n)$ serve as filter coefficients of the first notch filter 430. The first notch filter 430 filters a first interference frequency of the narrowband interference signal component, such as the interference frequency $f_1$ shown in FIG. 2, according to the filter coefficients $w_1(n)$ and $w_2(n)$. The second notch filter 440 filters a second interference frequency of the narrowband interference signal component, such as the interference frequency $2f_1$ shown in FIG. 2, according to the filter coefficient $v(n)$. The interference estimating device 420 adjusts the first notch filter 430 according to the adjustment signal $g(n)$ to filter the first interference frequency of the narrowband interference signal component. The interference estimating device 420 adjusts the second notch filter 440 according to the adjustment signal $g(n)$ to filter the second interference frequency of the narrowband interference signal component and generates the output digital signal $y(n)$.

In an embodiment, second notch filter 440 may be omitted. After the interference estimating device 420 adjusts the first notch filter 430 according to the adjustment signal $g(n)$ to filter the first interference frequency $f_1$ of the narrowband interference signal component, the generated digital signal $y_1(n)$ serves as the output digital signal $y(n)$.

In an embodiment, the interference estimating device 420 determines the reference value $r$ according to the filter coefficients $w_1(n)$ and $w_2(n)$. In response to the reference value $r$ being greater than or equal to the threshold value $r_{th}$, the interference estimating device 420 updates the adjustment signal $g(n)$ to enhance the interference suppression according to the adjustment parameter $\beta$. In response to the reference value $r$ being less than the threshold value $r_{th}$, the interference estimating device 420 updates the adjustment signal $g(n)$ to reduce the interference suppression strength according to the adjustment parameter $\beta$. Specifically, the reference value $r$ may be calculated through the equation below:

$$r = \frac{1 - w_1(n) - w_2(n)}{1 + w_1(n) - w_2(n)}$$

The adjustment signal $g(n)$ may be updated through the equation below:

$$g(n) = \begin{cases} g(n-1) + \beta \times (g_{max} - g(n-1)), & r \geq r_{th} \\ g(n-1) + \beta \times (g_{min} - g(n-1)), & r < r_{th} \end{cases}$$

In the equations above, $g_{max}$ and $g_{min}$ are respectively a maximum and a minimum allowed by the predetermined adjustment signal $g(n)$. Note that the adjustment signal $g(n)$ is in a range of 0 to 1. Therefore, the maximum $g_{max}$ and the minimum $g_{min}$ are also in a range of 0 to 1. By performing linear prediction on the narrowband interference signal component in the digital signal through the interference tracking digital signal $x_{Tr}(n)$ undergoing the high-pass filter and the adjustment signal $g(n)$ undergoing the interference estimating device and using the notch filter to suppress or filter the interference frequency corresponding to the narrowband interference signal component, the Doppler radar apparatus and the interference suppression method thereof provided by the embodiments of the disclosure may reduce the erroneous report of Doppler motion detection caused by the narrowband interference signal. Therefore, the accuracy of the Doppler motion detection may be increased.

Figure 6A:
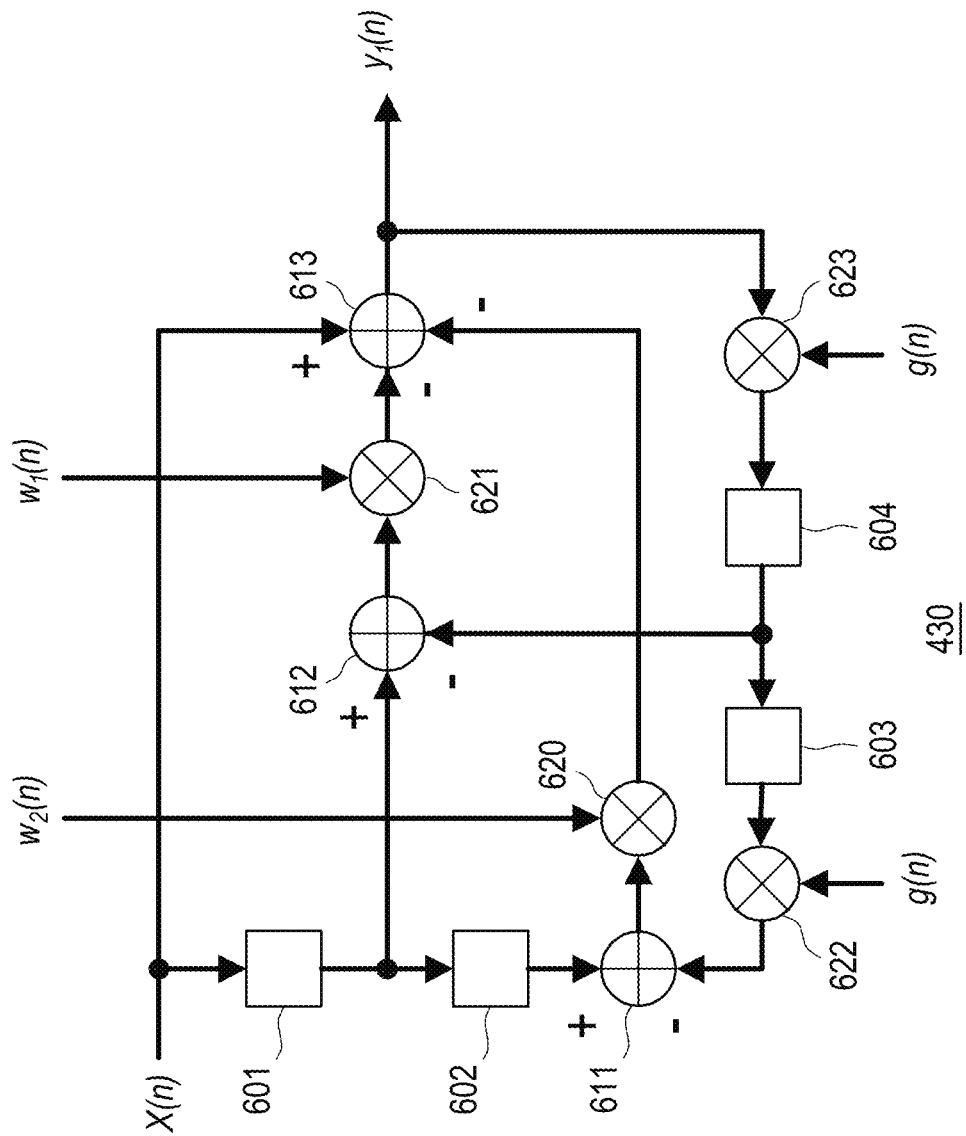
FIG. 6A is a schematic diagram of a first notch filter according to the second embodiment of the disclosure.

FIG. 6A is a schematic diagram of the first notch filter 430 according to the second embodiment of the disclosure. Referring to FIG. 6A, the first notch filter 430 includes a delay tap 601, a delay tap 602, a delay tap 603, a delay tap 604, an adder 611, an adder 612, an adder 613, a multiplier 620, a multiplier 621, a multiplier 622, and a multiplier 623.

The first digital signal $x(n)$ undergoes the delay tap 601 to be delayed into a digital signal $x(n-1)$. The digital signal $x(n-1)$ further undergoes the delay tap 602 to be delayed into a digital signal $x(n-2)$. The multiplier 623 multiplies the digital signal $y_1(n)$ by the adjustment signal $g(n)$ to obtain a digital signal $y_{1g}(n)=y_1(n) g(n)$. The digital signal $y_{1g}(n)$ undergoes the delay tap 604 to be delayed into a digital signal $y_{1g}(n-1)$. The digital signal $y_{1g}(n-1)$ further undergoes the delay tap 603 to be into a digital signal $y_{1g}(n-2)$.

The adder 612 subtracts the digital signal $y_{1g}(n-1)$ from the digital signal $x(n-1)$, and the value undergoes the multiplier 621 to be multiplied by the weighting coefficient $w_1(n)$. The multiplier 622 multiplies the digital signal $y_{1g}(n-2)$ by the adjustment signal $g(n)$ to obtain a digital signal $g(n)y_{1g}(n-2)$. The adder 611 subtracts the computing result $g(n)y_{1g}(n-2)$ of the multiplier 622 from the digital signal $x(n-2)$ to obtain $x(n-2)-g(n)y_{1g}(n-2)$. The multiplier 620 multiplies the computing result of the adder 611 by the weighting coefficient $w_2(n)$.

The adder 613 subtracts the computing result $w_1(n) [x(n-1)-y_{1g}(n-1)]$ of the multiplier 621 and the computing result $w_2(n) [x(n-2)-g(n)y_{1g}(n-2)]$ of the multiplier 620 from the first digital signal $x(n)$ to generate a digital signal $y_1(n)=x(n)-w_1(n) [x(n-1)-y_{1g}(n-1)]-w_2(n) [x(n-2)-g(n)y_{1g}(n-2)]$. Hence, the first notch filter 430 may filter or suppress the narrowband interference signal component corresponding to the interference frequency $f_1$ in the first digital signal $x(n)$.

FIG. 6B is a schematic diagram of frequency response of the first notch filter 430 according to the second embodiment of the disclosure. In FIG. 6B, the vertical axis represents the frequency magnitude response A, and the horizontal axis represents the frequency f. As shown in FIG. 6B, the magnitude adjacent to the interference frequency $f_1$ is less than 0 dB, so the first notch filter 430 may filter or suppress the narrowband interference signal component corresponding to the interference frequency $f_1$ in the first digital signal $x(n)$.

Figure 7A:
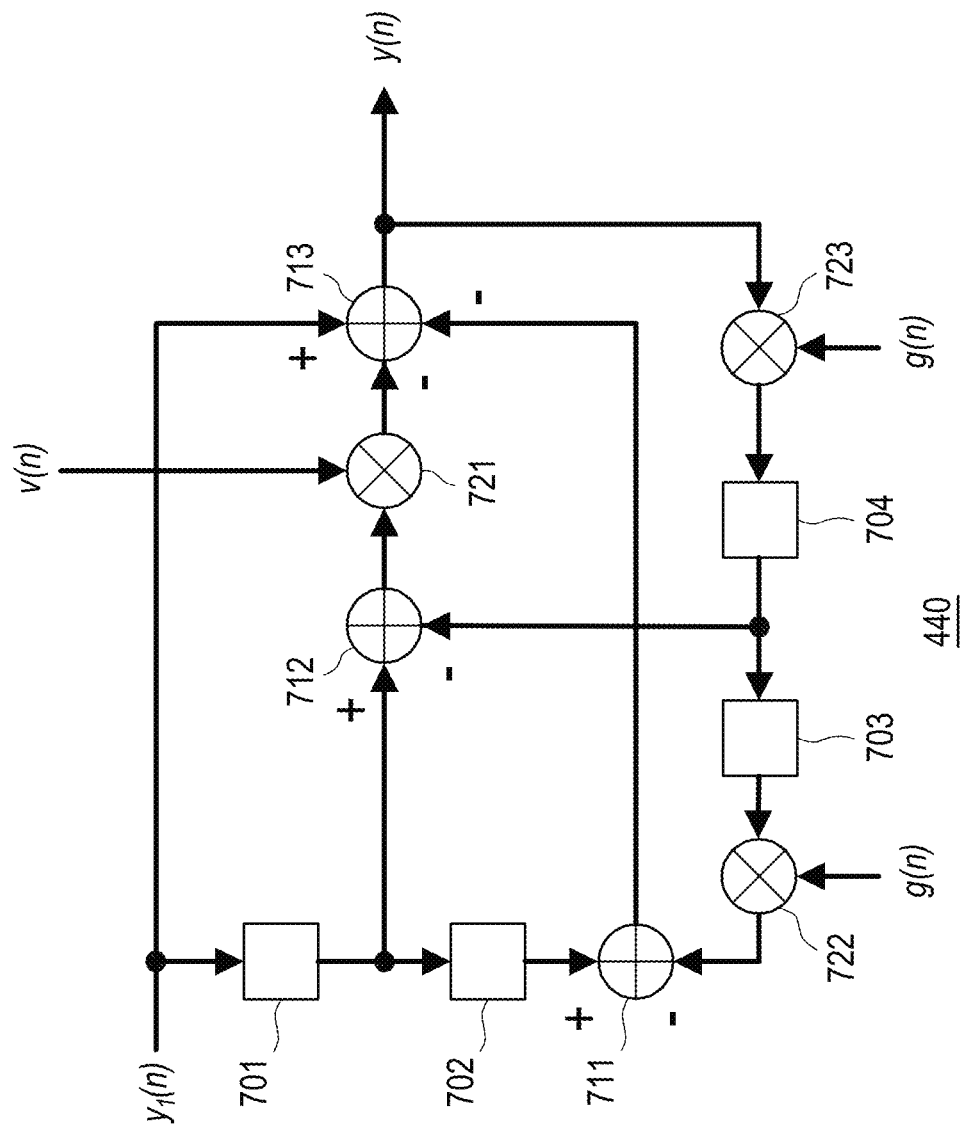
FIG. 7A is a schematic diagram of a second notch filter according to the second embodiment of the disclosure.

FIG. 7A is a schematic diagram of the second notch filter 440 according to the second embodiment of the disclosure. Referring to FIG. 7A, the second notch filter 440 includes a delay tap 701, a delay tap 702, a delay tap 703, a delay tap 704, an adder 711, an adder 712, an adder 713, a multiplier 721, a multiplier 722, and a multiplier 723.

The digital signal $y_1(n)$ undergoes the delay tap 701 to be delayed into a digital signal $y_1(n-1)$. The digital signal $y_1(n-1)$ further undergoes the delay tap 702 to be delayed into by a digital signal $y_1(n-2)$. The multiplier 723 multiplies the output digital signal $y(n)$ by the adjustment signal $g(n)$ to obtain a digital signal $y_g(n)=y(n)\ g(n)$. The digital signal $y_g(n)$ undergoes the delay tap 704 to be delayed into a digital signal $y_g(n-1)$. The digital signal $y_g(n-1)$ further undergoes the delay tap 703 to be delayed into a digital signal $y_g(n-2)$.

The adder 712 subtracts the digital signal $y_g(n-1)$ from the digital signal $y_1(n-1)$, and the value undergoes the multiplier 721 to be multiplied by the weighting coefficient $v(n)$. The multiplier 722 multiplies the digital signal $y_g(n-2)$ by the adjustment signal $g(n)$ to obtain a digital signal $g(n)y_g(n-2)$. The adder 711 subtracts the computing result $g(n)y_g(n-2)$ of the multiplier 722 from the digital signal $y_1(n-2)$ to obtain $y_1(n-2)-g(n)\ y_g(n-2)$.

The adder 713 subtracts the computing result $v(n)\ [y_1(n-1)-y_g(n-1)]$ of the multiplier 721 and the computing result $y_1(n-2)-g(n)\ y_g(n-2)$ of the adder 711 from the digital signal $y_1(n)$ to generate the output digital signal $y(n)=y_1(n)-v(n)\ [y_1(n-1)-y_g(n-1)]-[y_1(n-2)-g(n)\ y_g(n-2)]$. Hence, the second notch filter 440 may filter or suppress the narrowband interference signal component corresponding to the interference frequency $2f_1$ in the first digital signal $x(n)$ or the digital signal $y_1(n)$.

FIG. 7B is a schematic diagram of frequency response of the second notch filter 440 according to the second embodiment of the disclosure. In FIG. 7B, the vertical axis represents the frequency magnitude response A, and the horizontal axis represents the frequency f. As shown in FIG. 7B, the magnitude adjacent to the interference frequency $2f_1$ is less than 0 dB, so the second notch filter 440 may filter or suppress the narrowband interference signal component corresponding to the interference frequency $2f_1$ in the first digital signal $x(n)$ or the digital signal $y_1(n)$.

Note that in some embodiments, the narrowband interference suppression device 400 may also adopt multiple notch filters to suppress or filter the multiple interference frequencies in the narrowband interference signal component. For example, the multiple notch filters may respectively configured to filter the interference frequencies $f_1$, $2f_1$, $3f_1$, . . . , and so on. The narrowband interference suppression device 400 is not limited to adopting one or two notch filters.

In summary of the above, in the embodiments of the disclosure, by performing the linear prediction on the narrowband interference signal component in the digital signal and by the adjustment signal corresponding to the relation between the intensity of the Doppler signal component and the intensity of the narrowband interference signal component, the interference suppression strength may be adaptably adjusted. In addition, in the embodiments of the disclosure, the linear prediction is performed on the narrowband interference signal component in the digital signal through the interference tracking digital signal undergoing high-pass filtering, and the notch filter is used to suppress or filter the interference frequency corresponding to the narrowband interference signal component. Therefore, the Doppler radar apparatus and the interference suppression method thereof provided by the embodiments of the disclosure may reduce the false alarm of the Doppler motion detection caused by the narrowband interference signal. Therefore, the accuracy of the Doppler motion detection may be increased.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A Doppler radar apparatus, comprising:
   a transmitting device configured to transmit a first wireless signal;
   a receiving device coupled to the transmitting device and configured to receive a second wireless signal to generate a first digital signal, wherein the first digital signal comprises a Doppler signal component and a narrowband interference signal component, and a bandwidth of the narrowband interference signal component is smaller than a bandwidth of the Doppler signal component; and
   a narrowband interference suppression device coupled to the receiving device and configured to perform interference suppression on the first digital signal to suppress the narrowband interference signal component in the first digital signal to generate an output digital signal,
   wherein the narrowband interference suppression device comprises:
   a tapped delay line configured to obtain a delayed digital signal according to the first digital signal; and
   an interference estimating device coupled to the tapped delay line and configured to:
   generate an interference estimation signal according to the delayed digital signal and a plurality of weighting coefficients;
   update the weighting coefficients according to an error signal; and
   determine an adjustment signal according to the first digital signal, the weighting coefficients, and the error signal, wherein the interference estimation signal corresponds to the narrowband interference signal component, and the adjustment signal corresponds to interference suppression strength.

2. The Doppler radar apparatus according to claim 1, wherein the narrowband interference suppression device further comprises:
   a first multiplier coupled to the interference estimating device and configured to multiply the interference estimation signal by the adjustment signal to generate an interference suppression signal; and a first adder coupled to the first multiplier and configured to subtract the interference suppression signal from the first digital signal to generate the output digital signal.

3. The Doppler radar apparatus according to claim 1, wherein the narrowband interference suppression device further comprises:
a second adder coupled to the interference estimating device and configured to subtract the interference estimation signal from the first digital signal to generate the error signal; and
a second multiplier coupled to the second adder and configured to multiply the error signal by a tracking coefficient and feed back to the first digital signal, wherein the tracking coefficient is configured to adjust a frequency selection range of the interference suppression signal.

4. The Doppler radar apparatus according to claim 1, wherein the interference estimating device is further configured to:
determine a reference value according to the weighting coefficients;
in response to the reference value being greater than or equal to a threshold value, update the adjustment signal to enhance the interference suppression according to an adjustment parameter; and
in response to the reference value being less than the threshold value, update the adjustment signal to reduce the interference suppression according to the adjustment parameter.

5. The Doppler radar apparatus according to claim 1, further comprising:
a motion detector coupled to the narrowband interference suppression device, wherein the motion detector determines a motion of an object according to the output digital signal, wherein the second wireless signal comprises a reflection signal generated by the object reflecting the first wireless signal.

6. The Doppler radar apparatus according to claim 1, wherein the transmitting device comprises:
a local oscillator configured to generate an oscillation signal comprising a clock frequency;
a power amplifier, wherein a receiving end of the power amplifier is coupled to the local oscillator to receive the oscillation signal and provide a radio frequency signal; and
a transmitting end antenna coupled to the power amplifier to convert and transmit the radio frequency signal into the first wireless signal.

7. A Doppler radar apparatus, comprising:
a transmitting device configured to transmit a first wireless signal;
a receiving device coupled to the transmitting device and configured to receive a second wireless signal to generate a first digital signal, wherein the first digital signal comprises a Doppler signal component and a narrowband interference signal component, and a bandwidth of the narrowband interference signal component is smaller than a bandwidth of the Doppler signal component; and
a narrowband interference suppression device coupled to the receiving device and configured to perform interference suppression on the first digital signal to suppress the narrowband interference signal component in the first digital signal to generate an output digital signal;
wherein the narrowband interference suppression device comprises:

a high-pass filter configured to filter the Doppler signal component of the first digital signal to generate an interference tracking digital signal; and
an interference estimating device configured to:
obtain a plurality of weighting coefficients according to the interference tracking digital signal, wherein the weighting coefficients are associated with an interference frequency of the narrowband interference signal component, and obtain an error signal according to the interference tracking digital signal and the weighting coefficients;
update the weighting coefficients according to the error signal; and
determine an adjustment signal according to the weighting coefficients, wherein the adjustment signal corresponds to interference suppression strength.

8. The Doppler radar apparatus according to claim 7, wherein the weighting coefficients comprise a plurality of first filter coefficients, wherein the narrowband interference suppression device further comprises:
a first notch filter configured to filter a first interference frequency of the narrowband interference signal component according to the first filter coefficients, wherein the interference estimating device is further configured to:
adjust the first notch filter according to the adjustment signal to filter the first interference frequency of the narrowband interference signal component and generate the output digital signal.

9. The Doppler radar apparatus according to claim 7, wherein the weighting coefficients further comprise a plurality of first filter coefficients and at least one second filter coefficient, wherein the narrowband interference suppression device further comprises:
a first notch filter configured to filter a first interference frequency of the narrowband interference signal component according to the first filter coefficients; and
a second notch filter configured to filter a second interference frequency of the narrowband interference signal component according to the at least one second filter coefficient, wherein
the interference estimating device is further configured to:
adjust the first notch filter according to the adjustment signal to filter the first interference frequency of the narrowband interference signal component; and
adjust the second notch filter according to the adjustment signal to filter the second interference frequency of the narrowband interference signal component and generate the output digital signal.

10. The Doppler radar apparatus according to claim 7, wherein the interference estimating device is further configured to:
determine a reference value according to the weighting coefficients;
in response to the reference value being greater than or equal to a threshold value, update the adjustment signal to enhance the interference suppression according to an adjustment parameter; and
in response to the reference value being less than the threshold value, update the adjustment signal to reduce the interference suppression according to the adjustment parameter.

11. The Doppler radar apparatus according to claim 7, further comprising:
a motion detector coupled to the narrowband interference suppression device, wherein the motion detector determines a motion of an object according to the output digital signal, wherein the second wireless signal comprises a reflection signal generated by the object reflecting the first wireless signal.

12. The Doppler radar apparatus according to claim 7, wherein the transmitting device comprises:
   a local oscillator configured to generate an oscillation signal comprising a clock frequency;
   a power amplifier, wherein a receiving end of the power amplifier is coupled to the local oscillator to receive the oscillation signal and provide a radio frequency signal; and
   a transmitting end antenna coupled to the power amplifier to convert and transmit the radio frequency signal into the first wireless signal.

13. The Doppler radar apparatus according to claim 12, wherein the receiving device comprises:
   a receiving end antenna receiving the second wireless signal to generate a first analog signal;
   a low-noise amplifier coupled to the receiving end antenna and amplifying the first analog signal to generate a first amplified signal;
   a frequency mixer coupled to the low-noise amplifier and the local oscillator of the transmitting device, wherein the frequency mixer performs frequency mixing on the first amplified signal according to the clock frequency of the oscillation signal from the local oscillator to generate an analog receiving signal; and
   an analog-to-digital converter coupled to the frequency mixer and configured to convert the analog receiving signal into the first digital signal.

14. A narrowband interference suppression method applied to a Doppler radar apparatus, the narrowband interference suppression method comprising:
   transmitting a first wireless signal;
   receiving a second wireless signal to generate a first digital signal, wherein the first digital signal comprises a Doppler signal component and a narrowband interference signal component, and a bandwidth of the narrowband interference signal component is smaller than a bandwidth of the Doppler signal component; and
   performing interference suppression on the first digital signal to suppress the narrowband interference signal component in the first digital signal to generate an output digital signal, wherein the interference suppression comprises:
   filtering the Doppler signal component of the first digital signal to generate an interference tracking digital signal;
   obtaining a plurality of weighting coefficients according to the interference tracking digital signal, wherein the weighting coefficients are associated with an interference frequency of the narrowband interference signal component, and obtaining an error signal according to the interference tracking digital signal and the weighting coefficients;
   updating the weighting coefficients according to the error signal; and
   determining an adjustment signal according to the weighting coefficients, wherein the adjustment signal corresponds to interference suppression strength.

15. The narrowband interference suppression method according to claim 14, wherein the weighting coefficients comprise a plurality of first filter coefficients, wherein the interference suppression further comprises:
   filtering a first interference frequency of the narrowband interference signal component according to the first filter coefficients; and
   adjusting a first notch filter according to the adjustment signal to filter the first interference frequency of the narrowband interference signal component and generating the output digital signal.

16. The narrowband interference suppression method according to claim 14, wherein the weighting coefficients further comprise a plurality of first filter coefficients and at least one second filter coefficient, wherein the interference suppression further comprises:
   filtering a first interference frequency of the narrowband interference signal component according to the first filter coefficients;
   filtering a second interference frequency of the narrowband interference signal component according to the at least one second filter coefficient;
   adjusting a first notch filter according to the adjustment signal to filter the first interference frequency of the narrowband interference signal component; and
   adjusting a second notch filter according to the adjustment signal to filter the second interference frequency of the narrowband interference signal component and generate the output digital signal.

17. The narrowband interference suppression method according to claim 14, further comprising:
   determining a reference value according to the weighting coefficients;
   in response to the reference value being greater than or equal to a threshold value, updating the adjustment signal to enhance the interference suppression according to an adjustment parameter; and
   in response to the reference value being less than the threshold value, updating the adjustment signal to reduce the interference suppression according to the adjustment parameter.

18. The narrowband interference suppression method according to claim 14, further comprising:
   determining a motion of an object according to the output digital signal, wherein the second wireless signal comprises a reflection signal generated by the object reflecting the first wireless signal.

19. The narrowband interference suppression method according to claim 14, further comprising:
   generating an oscillation signal comprising a clock frequency;
   receiving the oscillation signal and providing a radio frequency signal; and
   converting and transmitting the radio frequency signal into the first wireless signal.

20. The narrowband interference suppression method according to claim 19, further comprising:
   receiving the second wireless signal to generate a first analog signal;
   amplifying the first analog signal to generate a first amplified signal;
   performing frequency mixing on the first amplified signal according to the clock frequency of the first wireless signal to generate an analog receiving signal; and
   converting the analog receiving signal into the first digital signal.

* * * * *